United States Patent
Primavesi et al.

(10) Patent No.: US 7,496,185 B1
(45) Date of Patent: Feb. 24, 2009

(54) SYSTEM AND METHOD OF COLLECTING, CORRELATING AND STORING TELECOM DATA AS CALL DETAIL RECORDS

(75) Inventors: Franco Primavesi, Washington, DC (US); Mario Margolis, Bethesda, MD (US)

(73) Assignee: Mantas, Inc., Herndon, VA (US)

( * ) Notice: Subject to any disclaimer, the term of this patent is extended or adjusted under 35 U.S.C. 154(b) by 965 days.

(21) Appl. No.: 11/021,735

(22) Filed: Dec. 23, 2004

Related U.S. Application Data

(60) Provisional application No. 60/533,133, filed on Dec. 30, 2003.

(51) Int. Cl.
*H04M 15/00* (2006.01)

(52) U.S. Cl. ............... 379/126; 379/32.01; 379/112.01; 379/133; 379/134

(58) Field of Classification Search .................. 379/111, 379/112.01, 112.02, 121.04, 126, 133, 134, 379/1.01, 9, 9.04, 9.05, 32.01
See application file for complete search history.

(56) References Cited

U.S. PATENT DOCUMENTS

| | | | |
|---|---|---|---|
| 5,551,025 A * | 8/1996 | O'Reilly et al. .......... 707/104.1 |
| 6,052,448 A * | 4/2000 | Janning ................. 379/115.01 |
| 6,327,350 B1 | 12/2001 | Spangler et al. |
| 6,381,306 B1 * | 4/2002 | Lawson et al. ........... 379/32.01 |
| 6,385,301 B1 | 5/2002 | Nolting et al. |
| 7,406,159 B2 * | 7/2008 | Russell .................. 379/114.14 |
| 2001/0012345 A1 * | 8/2001 | Nolting et al. ......... 379/112.01 |
| 2004/0008717 A1 * | 1/2004 | Verma et al. ................. 370/432 |
| 2005/0021713 A1 * | 1/2005 | Dugan et al. ................. 709/223 |
| 2005/0094623 A1 * | 5/2005 | D'Eletto ..................... 370/352 |
| 2006/0045248 A1 * | 3/2006 | Kernohan et al. .......... 379/126 |

* cited by examiner

*Primary Examiner*—Binh K Tieu
(74) *Attorney, Agent, or Firm*—Pepper Hamilton LLP

(57) ABSTRACT

Systems and methods for collecting, correlating, and storing telecom data as call detail records (CDRs) are described. A computer system collects real-time call data from a plurality of sources and stores the data in different memory locations. A real-time buffer is used to correlate the data into a CDR. A separate process collects reference data from one or more third-party sources to supplement each CDR and stores this data in different memory locations. A reference data buffer is then used to correlate the reference data into existing CDRs. A data manager layer then inserts each enhanced CDR into a plurality of distributed database systems. CDRs may be separated among multiple database systems, may be inserted into more than one database depending on application use, and may be partitioned to optimize access and retrieval.

18 Claims, 4 Drawing Sheets

SYSTEM AND METHOD OF COLLECTING, CORRELATING AND STORING TELECOM DATA AS CALL DETAIL RECORDS

RELATED APPLICATIONS AND CLAIM OF PRIORITY

This application claims priority to, and incorporates herein by reference, U.S. provisional patent application No. 60/533,133, entitled "System and Method of Collecting, Correlating and Storing Telecom Data as Call Detail Records," and filed Dec. 30, 2003.

TECHNICAL FIELD

The present invention relates to a system for and method of collecting and storing data related to telecommunications networks. In particular, the present invention relates to capturing, correlating, and storing real-time/or and non-real-time call detail records (CDRs) in a database for use in a plurality of applications.

BACKGROUND

Telecommunications service companies are interested in capturing and collecting call data from their networks. In addition to handling routing tasks, switches and other network devices typically generate one or more CDRs for every call that they handle. A CDR is a data record containing call information such as an originating number, a destination number, and/or the start and end times of a call. CDRs are normally transmitted from telecom network elements to computer systems for correlation, storage in databases, and use in a variety of applications, such as network traffic analysis, fraud investigation, and billing automation. It is also possible to supplement CDRs using additional data not available from hardware devices. By performing a lookup operation in a third party database such as a Line Identification Database or customer database, one could determine, for instance, whether a telephone number belongs to a residence or business and the mailing address associated with the number. The supplemented CDR thus has information not only about the call itself, but also about the individuals who participated in the call.

One challenge within this process is adequately handling the large volumes of call data, which might potentially represent hundreds of CDRs generated by a network each minute. For example, U.S. Pat. No. 6,327,350, entitled "Methods and Systems for Collecting and Processing Signaling System 7 (SS7) Message Signal Units (MSUs)" (the "'350 patent"), describes a system for collecting and processing SS7 probe message signaling units (MSUs) including a network interface for copying MSUs from an SS7 signaling link or a TCP/IP signaling link. A CDR generator communicates with the link interface to receive the copied MSUs and to parse the MSUs to extract desired parameters from the MSUs. An application interface kit receives commands from an application to control the flow of MSU parameters to the application in real time. While the '350 patent provides a means of retrieving large numbers of calls from an SS7 probe, it does not log all CDRs from a network, since it only processes data from an SS7 probe and filters CDR data based on desired parameters. Therefore, the usefulness of the CDR data is limited to the parameters by which the data was filtered. What is needed is a system suitable for capturing a CDR from every single call across all telecommunications hardware without losing data or slowing the computer system responsible for capture.

Another challenge within this process is the retrieval of supplemental third party information associated with a CDR. For example, U.S. Pat. No. 6,385,301, entitled "Data Preparation for Traffic Track Usage Measurement" (the "'301 patent"), describes a monitoring system that captures and processes messages from SS7 probe links to compile CDRs for all interoffice call attempts. The CDRs are uploaded into a relational database. A data preparation operation enhances the records for further processing. This data preparation operation involves translating information in the records into more useful forms, using external reference data regarding the monitored network. For example, the data preparation translates SS7 point codes or NPA-NXX codes in the records to textual names of the originating and terminating offices. The data, so prepared, is uploaded to an on-line analytical processing application. While this '301 patent provides a method of preparing SS7 data from one of the CDRs and obtaining additional information from an external database, it neither discusses the system nor addresses optimizing the performance of such a process. Looking up supplemental data for every single CDR record also places an incredible burden on the system. What is needed is a means of optimizing the capture of this third-party CDR data.

Furthermore, previous work in this area has primarily dealt with collecting CDR data and storing it in a database. Optimizing retrieval of the data from long-term storage is rarely discussed. What is needed is a means of optimizing retrieval of CDR data given its application of use.

Accordingly, we have determined that it is desirable to provide a method and system to collect all or substantially all CDRs without losing substantial data, and preferably without any data.

We have also determined that it is desirable to minimize the amount of reading and writing to a CDR database.

We have also determined that it is desirable to optimize retrieval of CDR data from long-term storage.

We have also determined that it is desirable to facilitate the presentation of relevant CDR data in a highly flexible and useful manner.

The present disclosure is directed to solving one or more of the problems described above.

SUMMARY

In an embodiment, a system for collecting, correlating and storing call detail records includes a plurality of real-time data sources, a plurality of reference data sources, a mediation and correlation layer, and a plurality of database systems. The mediation and correlation layer may receive real-time data from at least one real-time data source and reference data from at least one reference data source. The real-time data may include telecommunications data used to generate one or more call detail records. Each database system may receive correlated data from the mediation and correlation layer. The data may include a call detail record correlated with reference data. Each database system may include one or more databases. The real-time data sources may include one or more of an SS7 probe, a TCP/IP probe and a switch. The reference data sources may include one or more of a customer record information system and a line exchange routing guide. A database may be partitioned into a plurality of subgroups based on a specified portion of the data contained in a call detail record and/or a timestamp.

In an embodiment, the mediation and correlation layer includes one or more element managers, a real-time data buffer, one or more conveyors, a file input processor, a database index shared access memory loader, a reference data buffer and one or more data managers. Each element manager may receive real-time data from at least one real-time data source and store the real-time data in a real-time data buffer. The real-time data buffer may receive real-time data from at least one element manager and generate one or more call detail records based on at least a portion of the real-time data. At least one conveyor may receive and store a call detail record. A file input processor may receive reference data from the reference data sources. A database index shared access memory loader may receive reference data from the file input processor and index the reference data. A reference data buffer may receive indexed reference data from the database index shared access memory loader. At least one data manager may receive a call detail record from at least one conveyor, access the reference data buffer to retrieve and correlate a plurality of indexed reference data, associate the correlated reference data with the call detail record, and transmit the call detail record with the correlated reference data to at least one database system. Each element manager may include memory for temporarily storing the real-time data. The memory may be sized to store approximately 8 seconds of real-time data. The real-time data buffer may generate the call detail record by correlating real-time data received from a plurality of element managers. A database system may include one or more of a short-term database, a profiler database, and a long-term database. In an embodiment, the short-term database may include a database in which data is stored for no more than approximately 48 hours. In an embodiment, the long-term database may include a database in which data is stored for no more than approximately 60 days.

In an embodiment, the system further includes an application layer. The application layer may receive one or more call data records from at least one of the plurality of database systems and perform an application using the one or more call data records. In an embodiment, the application may include one or more of a fraud analysis application, a traffic analysis application, and a billing automation application.

In an embodiment, a method of capturing and storing a call detail record includes receiving, by a first element manager, real-time data from a first real-time data source; determining, by the first element manager, whether additional real-time data is desired from one or more second real-time data sources; if additional real-time data is desired, receiving, by one or more second element managers, the additional real-time data from the one or more second real-time data sources; correlating, by a real-time data buffer, the real-time data with the additional real-time data into a call detail record; storing the call detail record in a conveyor; retrieving, by a data manager, the call detail record from the conveyor; correlating, by a reference data buffer, reference data from one or more reference data sources; correlating, by the data manager, the correlated reference data and the call detail record into a correlated call detail record; and storing the correlated call detail record in one or more databases. In an embodiment, the element manager may receive real-time data only if the element manager has sufficient free memory to store the real-time data. In an embodiment, the real-time data buffer may select a conveyor with sufficient free memory to store a call detail record. In an embodiment, a data manager may retrieve a call detail record from a conveyor only if the data manager has sufficient free memory to store the call detail record.

NOTATIONS AND NOMENCLATURE

Before the present methods, systems and materials are described, it is to be understood that this invention is not limited to the particular methodologies, systems and materials described, as these may vary. It is also to be understood that the terminology used in the description is for the purpose of describing the particular versions or embodiments only, and is not intended to limit the scope of the present invention which will be limited only by the appended claims.

It must also be noted that as used herein and in the appended claims, the singular forms "a," "an," and "the" include plural references unless the context clearly dictates otherwise. Thus, for example, reference to a "call detail record" is a reference to one or more call detail records and equivalents thereof known to those skilled in the art, and so forth. Unless defined otherwise, all technical and scientific terms used herein have the same meanings as commonly understood by one of ordinary skill in the art. Although any methods, materials, and devices similar or equivalent to those described herein can be used in the practice or testing of embodiments of the present invention, the preferred methods, materials, and devices are now described. All publications mentioned herein are incorporated by reference. Nothing herein is to be construed as an admission that the invention is not entitled to antedate such disclosure by virtue of prior invention.

DETAILED DESCRIPTION

Embodiments presented herein include methods and systems for collecting, correlating, and storing telecom data as call detail records (CDRs). A computer system may identify and log all or substantially all call data passing through a telecommunications network in the form of a CDR. Additional third-party data may be added to each CDR, in accordance with its planned use. CDR data may be combined in a standard format and then held for long-term storage. The data may be distributed so as to optimize access and retrieval.

Figure 1:
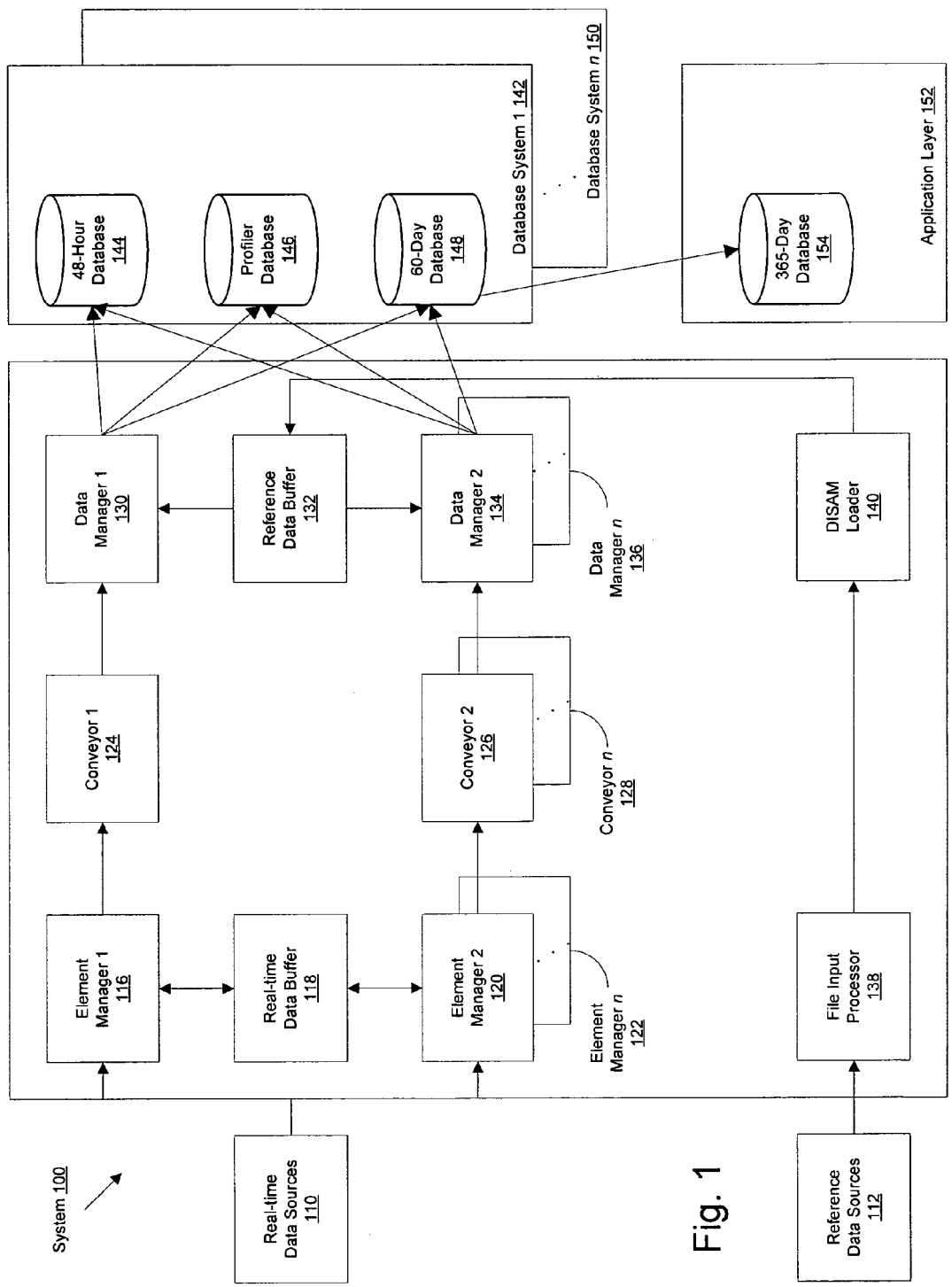
FIG. 1 illustrates a high-level functional block diagram of an exemplary telecommunications data collection, correlation, and storage system according to an embodiment.

FIG. 1 illustrates a high-level functional block diagram of an exemplary telecommunications data collection, correlation, and storage system 100 according to an embodiment. The system 100 may include a plurality of real-time data sources 110, a plurality of reference data sources 112, a mediation and correlation layer 114, a first database system 142, and an application layer 152. The system 100 may include a plurality of database systems identical to first database system 142, as noted by the presence of an $n^{th}$ database system 150 in FIG. 1.

In an embodiment, the mediation and correlation layer 114 may include a first element manager 116, a real-time data buffer 118, a second element manager 120, a first conveyor 124, a second conveyor 126, a first data manager 130, a reference data buffer 132, a second data manager 134, a file input processor 138, and a database index shared access memory (DISAM) loader 140. The mediation and correlation layer 114 may include a plurality of element managers, conveyors, and data managers, as noted by the presence of an n$^{th}$ element manager 122, an n$^{th}$ conveyor 128, an n$^{th}$ data manager 136, respectively.

In an embodiment, one or more of the database systems, such as 142, 150, may further include a 48-hour database 144, a profiler database 146, and a 60-day database 148. In an embodiment, the application layer 152 may further include a 365-day database 154.

In an embodiment, the system 100 may be a general computer and database system. The plurality of real-time data sources 110 may include probes, switches, and/or other pieces of hardware located within a telecommunication carrier's network. These devices may generate detailed information about each telephone, cellular, and/or other call in the form of a CDR as the calls are routed to and from a carrier. In addition to the real-time data sources 110, the system 100 may include a plurality of reference data sources 112, such as a Customer Record Information System or a Line Exchange Routing Guide. These non-real-time data sources may provide supplemental information to CDRs that is not available from real-time data sources 110. Examples of specific data for both real- and non-real-time sources are given in FIG. 2, which is described in more detail below.

Real-time data sources 110 and reference data sources 112 may provide input data for the mediation and correlation layer 114 of the system 100. In an embodiment, each real-time data source 110 may have a corresponding element manager, such as 116, 120 or 122. In an embodiment, each element manager may be a custom interface designed to process information from a specific telecommunications data source 110 (such as an SS7 probe) and to collect and store data coming from the data source 110. For example, in an embodiment, first element manager 116 may be designed to understand the format in which an SS7 probe passes call data to the system 100. First element manager 116 may collect and store call data from an SS7 probe in memory until another process retrieves it. In an embodiment, a real-time data buffer 118 may correlate data received from two or more different real-time data sources 110 via two or more element managers 116, 120, or 122 into a single CDR. For example, call details from an SS7 probe for which data is received via first element manager 116 and supplemental call data from a Telecordia Line Identification Database (LIDB) for which data is received via second element manager 120 may be combined into a single CDR. Real-time data sources 110 may be collected and correlated using any element manager.

Once data from the real-time data sources 110 have been collected and processed by their respective element managers and correlated via the real-time data buffer 118, the enhanced CDR data may be passed to a shared memory space, such as first conveyor 124. First conveyor 124 may represent a memory space similar to that within any other computer system. Each element manager may have one or more corresponding conveyors. The number of conveyors that correspond to an element manager may be based on the amount of data expected to flow through the mediation and correlation layer 114 at, for example, a peak usage time. In an embodiment, each element manager may have a limited data buffer. In an embodiment, the data buffer may permit, for example, eight seconds of data to be accumulated before the buffer is full. If the buffer is full, no additional data may be added to the buffer. If additional data is attempted to be stored in the buffer, the data may be dropped. Accordingly, a conveyor may be used to extend this limited buffer and prevent loss of data from the real-time data sources 110 as it is passed through the element manager. For example, if first conveyor 124 alone cannot handle the amount of data coming from various element managers, another conveyor such as second conveyor 126 may be used in parallel with first conveyor 124. Additional or alternate conveyors may be used to process incoming data from an element manager.

The conveyors may store CDR data until a data management process, such as first data manager 130, retrieves it. Each data manager may be responsible for retrieving CDR data from a conveyor and inserting it into one or more databases in each of one or more database systems (e.g., first database system 142 and n$^{th}$ database system 150) for long-term storage. If first data manager 130 cannot write to a particular database or database system, such as if the database or database system has gone offline, first data manager 130 could block data which could cause loss of data by the element managers or the conveyors. Accordingly, in order to substantially prevent loss of data, each conveyor may correspond to one or more data managers based on the amount of data flowing through the mediation and correlation layer 114 and the amount of data to be written to each database system.

The real-time data sources 110 may be correlated with existing CDR data at the element manager level. In order to distribute processing and to avoid overloading element managers, the reference data sources 112 may be correlated with existing CDR data at the data manager level. Each reference data source 112 may be brought into the mediation and correlation layer 114 through file input processor 138. In an embodiment, the file input processor 138 may be a program within the system 100 that communicates with the reference data sources 112 to determine the data formats of the various reference data sources 112. The file input processor 138 may then pass data to the DISAM loader 140. The DISAM loader 140 may index the reference data sources 112 so that the data managers and database systems can quickly access the data. A reference data buffer 132 may be accessed by the plurality of data managers to gather and correlate two or more different reference data sources 112, such as a customer credit rating from a Customer Record Information System and a carrier's operating company number (OCN) from a LERG. The correlated reference data sources 112 may then be associated with existing CDR data temporarily being stored by a plurality of data managers.

Once real-time and non-real-time data is collected and correlated in the mediation and correlation layer 114, each CDR may be inserted into one or more databases in, for example, first database system 142 for longer-term storage. The number of databases within first database system 142 and the periodicity of the data within each database may be based on the number of applications accessing the data. For example, an n$^{th}$ data manager 136 may simultaneously load the same CDR into 48-hour database 144, profiler database 146, and 60-day database 148.

In an embodiment, a fraud application may only use CDR data from the last 48 hours. The fraud application may analyze incoming CDRs and generate appropriate anti-fraud actions quickly and efficiently. As such, the fraud application need not sort through a large collection of historical CDR data. The fraud application may utilize, for example, 48-hour database 144, which may collect all CDRs for 48 hours before writing over the previous 48 hours of CDR data.

In an embodiment, a traffic analysis application may use CDR data from the past 60 days. The traffic analysis application may determine trends in call traffic patterns and may examine the activity of a particular telephone number over the 60-day time period. The traffic analysis application may utilize, for example, 60-day database 148, which may collect all CDRs for 60 days before writing over previously existing CDR data.

The periodicity of each database may be customizable depending on the intended uses of the CDR data. In an embodiment, additional databases having additional or alternate periodicities may be used by a database system to satisfy the requirements of other applications. In addition, databases having additional or alternate time periods may be utilized by the exemplary applications described above and further described below.

In addition to differing in periodicity, each database within first database system 142 may also be partitioned differently. Database partitioning may include subdividing the data contained within a database into smaller pieces. In this manner, the data may be managed and accessed at a finer level of granularity. While partitioning can be done in any number of ways, an exemplary partitioning is discussed below.

In an embodiment, CDRs in a 48-hour database 144 may be assigned timestamps based on a time interval such as minutes or hours. For example, each CDR that is received between 1:00 pm and 3:00 pm may receive a timestamp of "13:00-15:00." If an application needs to analyze data for only those two hours, the application may not search the entire database to find the appropriate data. In an embodiment, the application may automatically reduce its search space based on the partition, which may result in significant improvements in performance.

First database system 142 may also be replicated based on the number of calls coming from a company's network. This may allow the combined database systems to handle very high volumes of call data. In replication, one or more copies of the database architecture may be utilized. Duplicates such as $n^{th}$ database system 150 may perform the same function as first database system 142. However, each database system may be responsible for storing different data. For example, all CDRs containing an originating telephone number with the last two digits in the range 00-49 may be written to first database system 142, whereas CDRs containing an origin telephone number ending in the range 50-99 may be written to $n^{th}$ database system 150. The method used to distribute the data across the database systems may be completely customizable. Moreover, the method may also be a direct function of the volume of call data of each telecom company.

Application layer 152 may contain a 365-day database 154. The application layer 152 may be used for optimization purposes and to store data for application use. In an embodiment, 365-day database 154 may not interact directly with data managers. Instead, 60-day database 148 may periodically write data into 365-day database 154. This may create a larger, long-term database that would not impact the processes of mediation and correlation layer 114 if 365-day database 154 were to slow or crash. The collection and retrieval process for CDR data may be optimized based on the intent of use in this manner.

Figure 2:
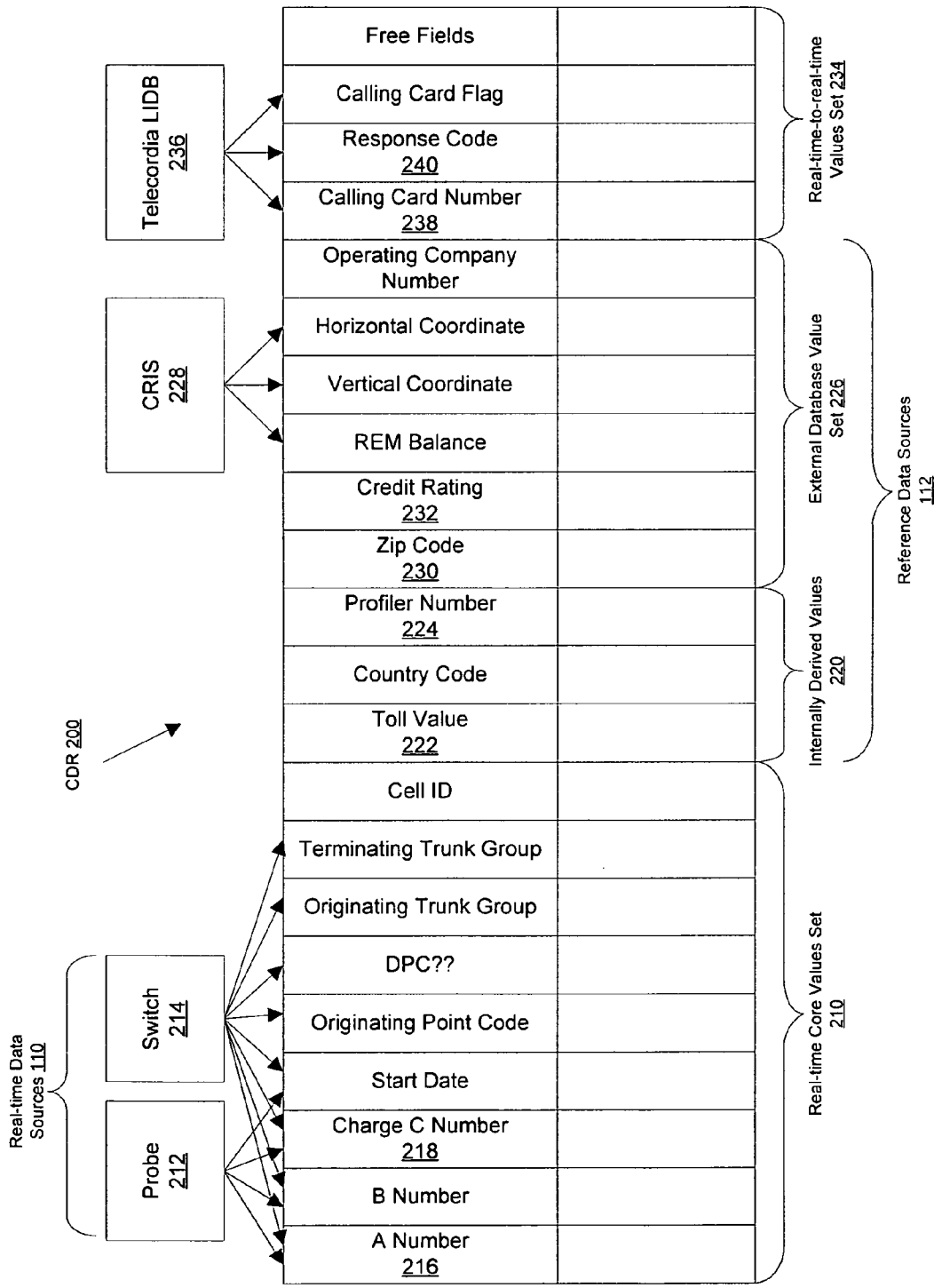
FIG. 2 illustrates an exemplary expanded CDR with a variety of fields coming from different real-time and non-real-time data sources according to an embodiment.

FIG. 2 illustrates an exemplary expanded CDR with a variety of fields coming from different real-time and non-real-time data sources according to an embodiment. In particular, FIG. 2 illustrates a CDR 200 including real-time data sources 110, further including a probe 212 and a switch 214; reference data sources 112, further including a plurality of internally derived values 220 and an external databases value set 226; a Customer Record Information System (CRIS) 228; and a Telecordia Line Identification Database (LIDB) 236. CDR 200 may include a real-time core values set 210, further including an A number 216 and a charge C number 218; internally derived values 220, further including a toll value 222 and a profiler number 224; external databases value set 226, further including a zip code 230 and a credit rating 232; and a real-time-to-real-time values set 234, further including a calling card number 238 and a response code 240.

CDR 200 may be a record containing real- and non-real-time data sources assembled within mediation and correlation layer 114 and inserted into a database system as described in reference to FIG. 1. Real-time data sources 110 may be used as inputs to CDR 200 to capture real-time core values set 210. Probe 212 and/or switch 214, which are conventional telecommunications apparatuses, may be responsible for providing a plurality of these values in the form of fields. A Number 216 may represent the originating number of a telephone call, e.g., (212) 555-1212. Charge C Number 218 may represent the telephone number to which to bill the call. Charge C Number 218 may be the same as A Number 216 in the example of a residential phone call. However, Charge C Number 218 may be different if the call is a collect call, is charged to a credit card, or is a third-party call. Additional fields within real-time core values set 210 are shown in FIG. 2 as examples.

CDR 200 may determine supplemental information by looking up one or more internally derived values 220. Internally derived values 220 may typically be stored within an internal database in system 100 and may be inserted in CDR 200 using reference data buffer 132 as described in reference to FIG. 1. CDR 200 may pass unique information from real-time core values set 210 to the internal database to retrieve additional information. For example, by providing the destination number and length of a call from CDR 200, an internal database may calculate the approximate toll value 222 of the call and correlate this value with an existing CDR 200. Additional internally derived values 220 are also shown in FIG. 2, such as profiler number 224, which may provide a unique ID for a user making a call.

CDR 200 may also use reference data sources 112 that exist within external databases. This data, shown as external database values set 226 in FIG. 2, may be received from, for example, CRIS 228. CDR 200 may pass unique information from real-time core values set 210 to the external database to retrieve additional information about CDR 200. If CDR 200 includes A Number 216 and has retrieved the caller's name and address, this information may be sent to CRIS 228 to retrieve zip code 230 or even credit rating 232. These values may then be correlated with an existing CDR 200. Additional fields within external database values set 226 are shown in FIG. 2 as examples.

Additional real-time data sources 110 that are not available from telecommunications hardware may also exist. This data, shown as real-time-to-real-time values set 234, may be received from, for example, Telecordia LIDB 236. CDR 200 may pass unique information to the external database to retrieve additional information about CDR 200. For example, a CDR 200 may send Charge C Number 218 to Telecordia LIDB 236 to authenticate a user attempting to make a calling card call using calling card number 238. If the user is validated, the call may be placed, and the user may be billed based on usage. Additional examples of real-time-to-real-time values set 234 data, including response code 240, are shown in FIG. 2 as examples.

Figure 3:
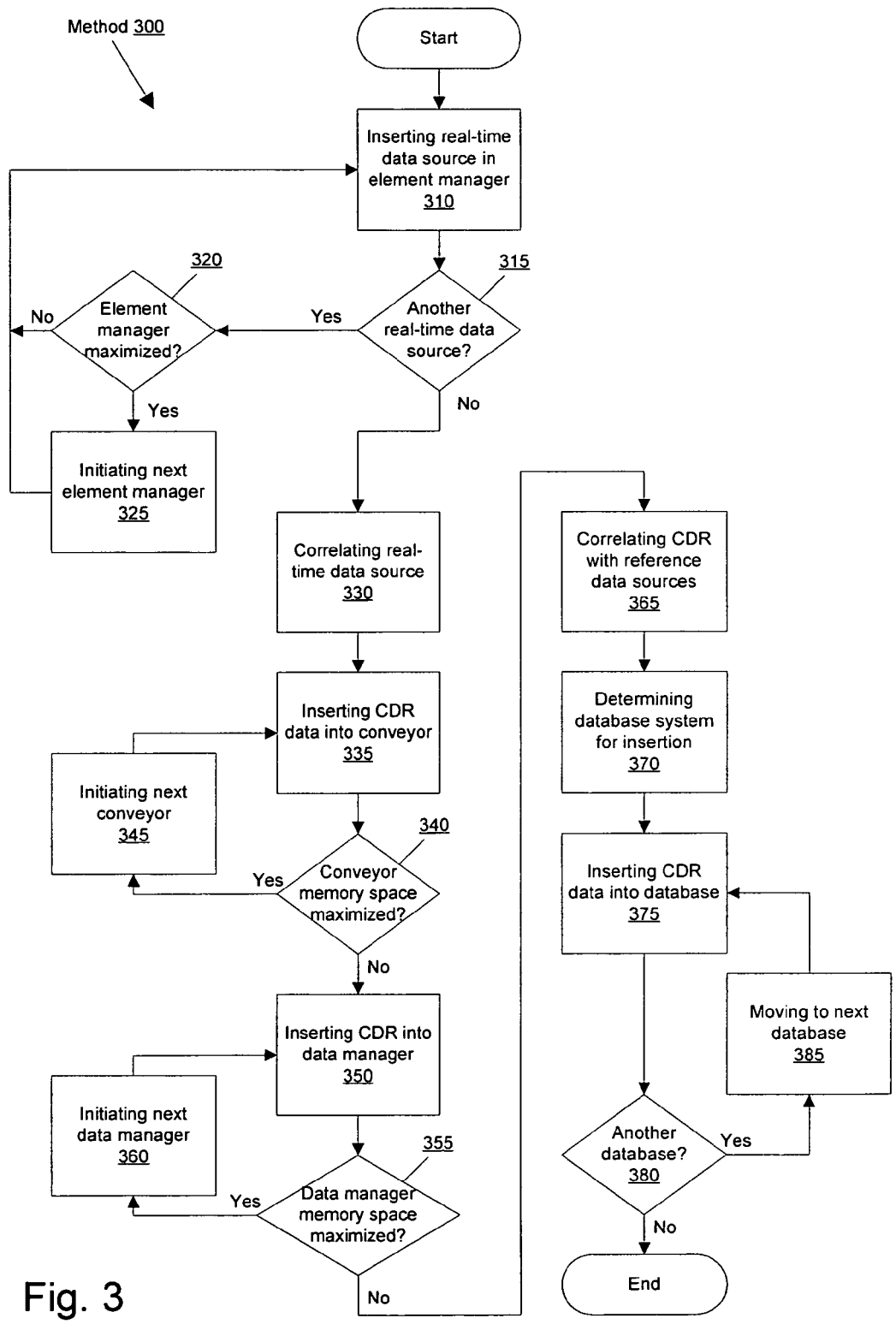
FIG. 3 illustrates a flow diagram of an exemplary method of CDR capture and storage according to an embodiment.

FIG. 3 illustrates a flow diagram of an exemplary method 300 of CDR capture and storage according to an embodiment. Initially, an element manager, such as first element manager 116 may read 310 CDR data from a real-time data source 110, such as probe 212, and temporarily store this data. The system 100 may then determine 315 whether the element manager must collect additional data from a different real-time data source 100, such as switch 214. If the element manager must collect data, the system 100 may then determine 320 whether the current element manager's memory space is maximized with existing CDR data. If the memory space is maximized, a new element manager, such as second element manager 120, may be initiated 325 in order to read CDR data from a different real-time data source 110 (e.g., switch 214). The method may then return to step 310. If the memory space is not maximized, the method 300 may return to step 310.

Element managers, such as 116 and 120, may place CDR data in the real-time data buffer 118. CDRs collected by the element managers may be correlated with previous CDRs (stored in the real-time data buffer 118). Once all required data, from the real-time data buffer 118 and real-time sources 110 is collected, an element manager may place the data in a conveyor, such as first conveyor 124, which temporarily stores this data.

The system 100 may then determine 340 whether the current conveyor's memory space is maximized with existing CDR data. If the memory space is maximized, a new conveyor, such as second conveyor 126, may be initiated 345 in order to read additional CDR data being held in any element manager. The method 300 may then return to step 335. Otherwise, a data manager, such as first data manager 130, may read 350 CDR data from a conveyor, such as first conveyor 124, and temporarily store this data.

The system 100 may then determine 355 whether the current data manager's memory space is maximized with existing data. If the memory space is maximized, a new data manager, such as second data manager 134, may be initiated 360 in order to read additional CDR data being held in any conveyor. The method 300 may then return to step 350. Otherwise, existing CDR data may be correlated 365 with reference data sources 112. Reference data buffer 132 may correlate various reference data sources 112 before correlating them with existing CDR data. The system 100 may then analyze 370 CDR data to determine into which database system each record should be inserted. For example, CDRs originating in a specific area code may be inserted into first database system 142. CDR data held in the current data manager may be inserted 375 into a database, such as 48-hour database 144.

The system 100 may then determine whether the CDR data should be inserted into another database. If the CDR data should be inserted into another database, the CDR insertion process may select 385 another database, such as profiler database 146 in which to insert the CDR data. The method 300 may then return to step 375. Otherwise, the method 300 may end.

Figure 4:
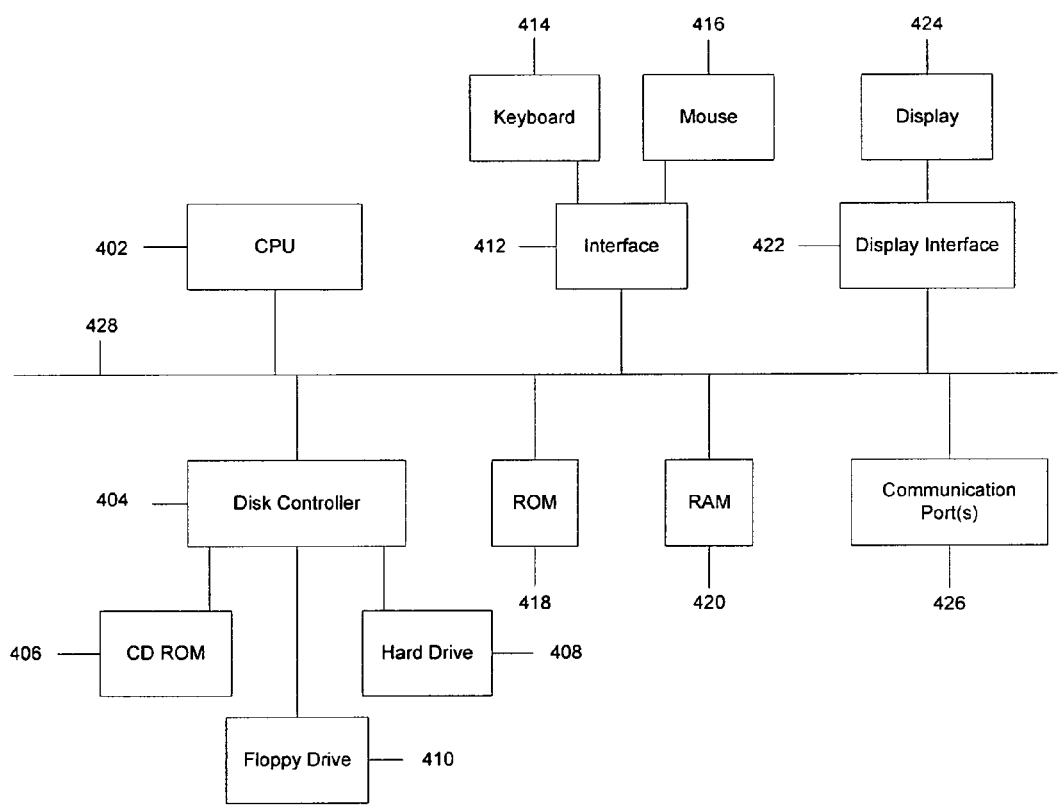
FIG. 4 depicts a block diagram illustrating exemplary components of a representative computer system according to an embodiment.

FIG. 4 is a block diagram of exemplary hardware that may be used to contain and/or implement the program instructions of system embodiments of the present invention. Referring to FIG. 4, a bus 428 serves as the main information highway interconnecting the other illustrated components of the hardware. CPU 402 is the central processing unit of the system, performing calculations and logic operations required to execute a program. Read only memory (ROM) 418 and random access memory (RAM) 420 constitute memory devices.

A disk controller 404 interfaces one or more optional disk drives to the system bus 428. These disk drives may be external or internal floppy disk drives such as 410, external or internal CD-ROM, CD-R, CD-RW or DVD drives such as 406, or external or internal hard drives 408. As indicated previously, these various disk drives and disk controllers are optional devices.

Program instructions may be stored in the ROM 418 and/or the RAM 420. Optionally, program instructions may be stored on a computer readable carrier such as a digital disk, recordable memory device or other recording medium, a communications signal, or a carrier wave.

Each of the element managers, real-time data buffer, conveyors, file input processor, database index shared access memory loader, reference data buffer and data managers may include a software application stored in one or more of the disk drives connected to the disk controller 404, the ROM 418 and/or the RAM 420. Preferably, the CPU 402 may access each component as required.

A display interface 422 may permit information from the bus 428 to be displayed on the display 424 in audio, graphic or alphanumeric format. Communication with external devices may optionally occur using various communication ports such as 426.

In addition to the standard computer-type components, the hardware may also include data input devices such as a keyboard 414 or pointing input devices 416 such as a remote control, pointer, mouse and/or joystick.

It is to be understood that the invention is not limited in its application to the details of construction and to the arrangements of the components or steps set forth in this description or illustrated in the drawings. The disclosed method and system are capable of other embodiments and of being practiced and carried out in various ways. Hence, it is to be understood that the phraseology and terminology employed herein are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the disclosed embodiments.

What is claimed is:

1. A system for collecting, correlating and storing call detail records, the system comprising:
    a plurality of real-time data sources;
    a plurality of reference data sources;
    a mediation and correlation layer, wherein the mediation and correlation layer receives real-time data from at least one real-time data source and reference data from at least one reference data source, wherein the real-time data comprises telecommunications data used to generate one or more call detail records; and
    a plurality of database systems, wherein each database system receives correlated data from the mediation and correlation layer, wherein the data comprises a call detail record correlated with reference data, wherein each database system comprises one or more databases.

2. The system of claim 1 wherein each of the real-time data sources comprises one or more of an SS7 probe, a TCP/IP probe and a switch.

3. The system of claim 1 wherein each of the reference data sources comprises one or more of a customer record information system and a line exchange routing guide.

4. The system of claim 1 wherein a database is partitioned into a plurality of subgroups, wherein the subgroups are determined based on a specified portion of the data contained in a call detail record.

5. The system of claim 1 wherein a database is partitioned into a plurality of subgroups, wherein the subgroups are determined based on a timestamp.

6. The system of claim 1 wherein the mediation and correlation layer comprises:
    one or more element managers, wherein each element manager receives real-time data from at least one real-time data source and stores the real-time data in a real-time data buffer;
    a real-time data buffer, wherein the real-time data buffer receives real-time data from at least one element manager, and generates one or more call detail records based on at least a portion of the real-time data;

one or more conveyors, wherein at least one conveyor receives and stores a call detail record;

a file input processor that receives reference data from the reference data sources;

a database index shared access memory loader that receives reference data from the file input processor and indexes the reference data;

a reference data buffer that receives indexed reference data from the database index shared access memory loader; and one or more data managers, wherein at least one data manager receives a call detail record from at least one conveyor, accesses the reference data buffer to retrieve and correlate a plurality of indexed reference data, associates the correlated reference data with the call detail record, and transmits the call detail record with the correlated reference data to at least one database system.

7. The system of claim 6 wherein each element manager comprises memory for temporarily storing the real-time data.

8. The system of claim 7 wherein the memory is sized to store approximately 8 seconds of real-time data.

9. The system of claim 6 wherein the real-time data buffer generates the call detail record by correlating real-time data received from a plurality of element managers.

10. The system of claim 1 wherein a database system comprises one or more of the following:
   a short-term database;
   a profiler database; and
   a long-term database.

11. The system of claim 10 wherein the short-term database comprises a database in which data is stored for no more than approximately 48 hours.

12. The system of claim 10 wherein the long-term database comprises a database in which data is stored for no more than approximately 60 days.

13. The system of claim 1, further comprising:
   an application layer, wherein the application layer receives one or more call data records from at least one of the plurality of database systems and performs an application using the one or more call data records.

14. The system of claim 13 wherein the application comprises one or more of the following:
   a fraud analysis application;
   a traffic analysis application; and
   a billing automation application.

15. A method of capturing and storing a call detail record, the method comprising:
   receiving, by a first element manager, real-time data from a first real-time data source;
   determining, by the first element manager, whether additional real-time data is desired from one or more second real-time data sources;
   if additional real-time data is desired, receiving, by one or more second element managers, the additional real-time data from the one or more second real-time data sources;
   correlating, by a real-time data buffer, the real-time data with the additional real-time data into a call detail record;
   storing the call detail record in a conveyor;
   retrieving, by a data manager, the call detail record from the conveyor;
   correlating, by a reference data buffer, reference data from one or more reference data sources;
   correlating, by the data manager, the correlated reference data and the call detail record into a correlated call detail record; and
   storing the correlated call detail record in one or more databases.

16. The method of claim 15 wherein the element manager receives real-time data only if the element manager has sufficient free memory to store the real-time data.

17. The method of claim 15 wherein the real-time data buffer selects a conveyor with sufficient free memory to store a call detail record.

18. The method of claim 15 wherein a data manager retrieves a call detail record from a conveyor only if the data manager has sufficient free memory to store the call detail record.

* * * * *